Oct. 29, 1940.   H. S. WHITFORD   2,219,671
CLASP BRAKE
Filed Nov. 4, 1938   2 Sheets-Sheet 1

Inventor
Harry S. Whitford.
By R. S. A. Dougherty
Attorney

Oct. 29, 1940. H. S. WHITFORD 2,219,671
CLASP BRAKE
Filed Nov. 4, 1938 2 Sheets-Sheet 2
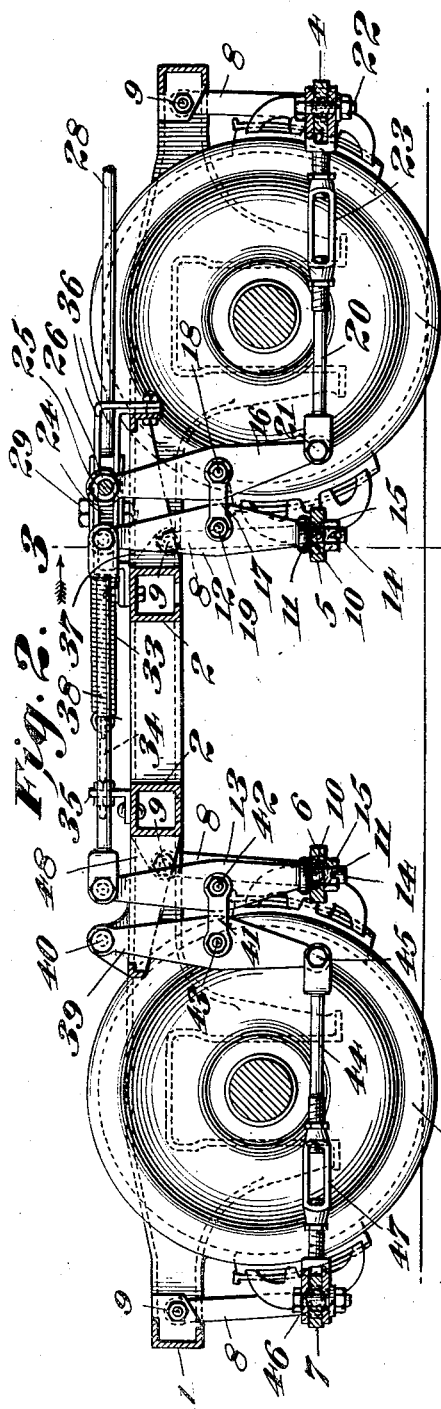
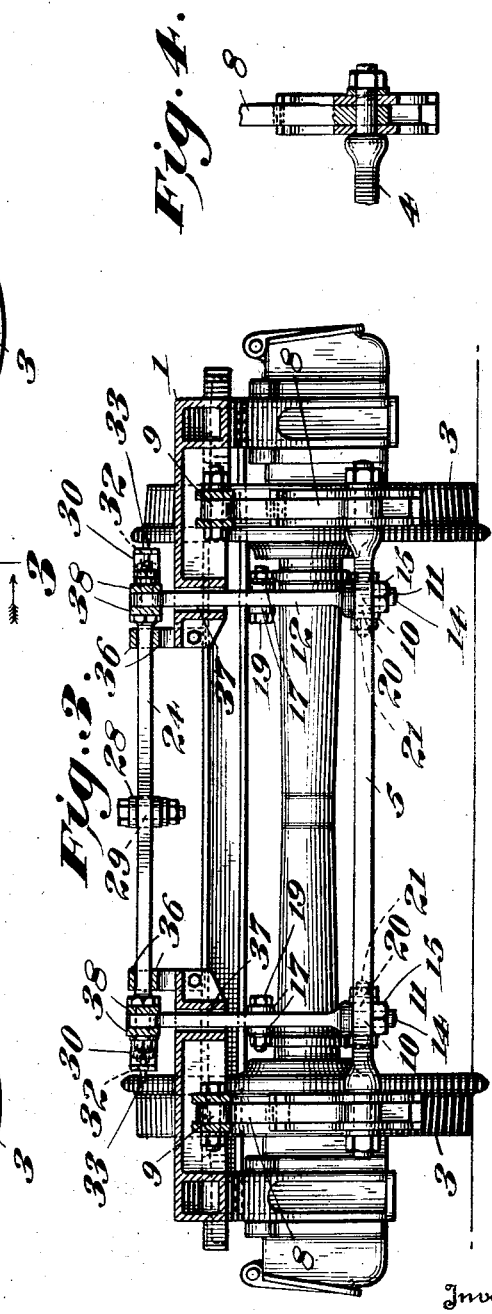
Inventor
Harry S. Whitford
By P. S. C. Dougherty
Attorney Patented Oct. 29, 1940

2,219,671

UNITED STATES PATENT OFFICE 2,219,671

CLASP BRAKE

Harry S. Whitford, Fountain Hill, Pa., assignor to Bethlehem Steel Company, a corporation of Pennsylvania Application November 4, 1938, Serial No. 238,785

4 Claims. (Cl. 188—56)

My invention relates to brake rigging for railway cars, and more particularly to a clasp brake for a four-wheel trailer truck to be used with body mounted brake cylinders and has been designed to overcome certain objectionable features of brakes which have been installed in the past.

In the conventional clasp brake for trailer trucks now in use, the truck brake equalizer bar is placed out beyond the end of the truck frame and not attached to the truck, but carried on guides depending from the car body. Due to its location, and lateral and longitudinal travel, it takes up much valuable space that could be utilized for the application of body hung equipment.

In the usual structures of this type now in use, at the end of the truck opposite the equalizer bar are located lever fulcrums, which due to their location, have caused trouble on most jobs due to their hitting into the steam train line, and at times the center sills, depending on conditions and curvature of the track.

My arrangement locates the equalizer bar in an out of the way position, close to the truck center plate, where the lateral movement is slight and makes the lateral movement of the pull rods negligible, with the result that the body equipment can be hung close up to the end of the truck. It also locates the lever fulcrums close in toward the body center plate, out of the way, and the design eliminates and lightens a number of parts which are necessary on the conventional clasp brake structures now in use.

One of the objects of my invention relates to the manner of locating the equalizer bar for operating a clasp brake in an out of the way position close to the truck center plate and attach the ends of the equalizer bar directly to the upper ends of the live operating truck levers.

Another object of my invention relates to the manner of securing the lower ends of the live truck levers directly to the inner brake beams at an intermediate point between the wheels of the truck.

Another object of my invention is to provide an improved clasp brake rigging for a four-wheel trailer truck of this character, in which the truck levers are located close together in pairs disposed at the inner side of each axle, and another object relates to the means for supporting the truck levers and rigging on the truck frame.

With these and other objects in view, my invention consists of certain novel features of construction and operation, as will be more fully described and particularly pointed out in specification, drawings and claims appended hereto.

Having thus given a general description of the advantages of my invention, I will now in order to make the same more clear, refer to the annexed two sheets of drawings forming a part of this specification and in which like characters of reference indicate like parts:

Fig. 2 is a vertical longitudinal section taken on the line 2—2 of Fig. 1;

Fig. 3 is a vertical transverse section taken on the line 3—3 of Fig. 2; and

Fig. 4 is a detail view illustrating the manner of connecting a brake head to the end of a brake beam and the lower end of a hanger link.

Figure 1:
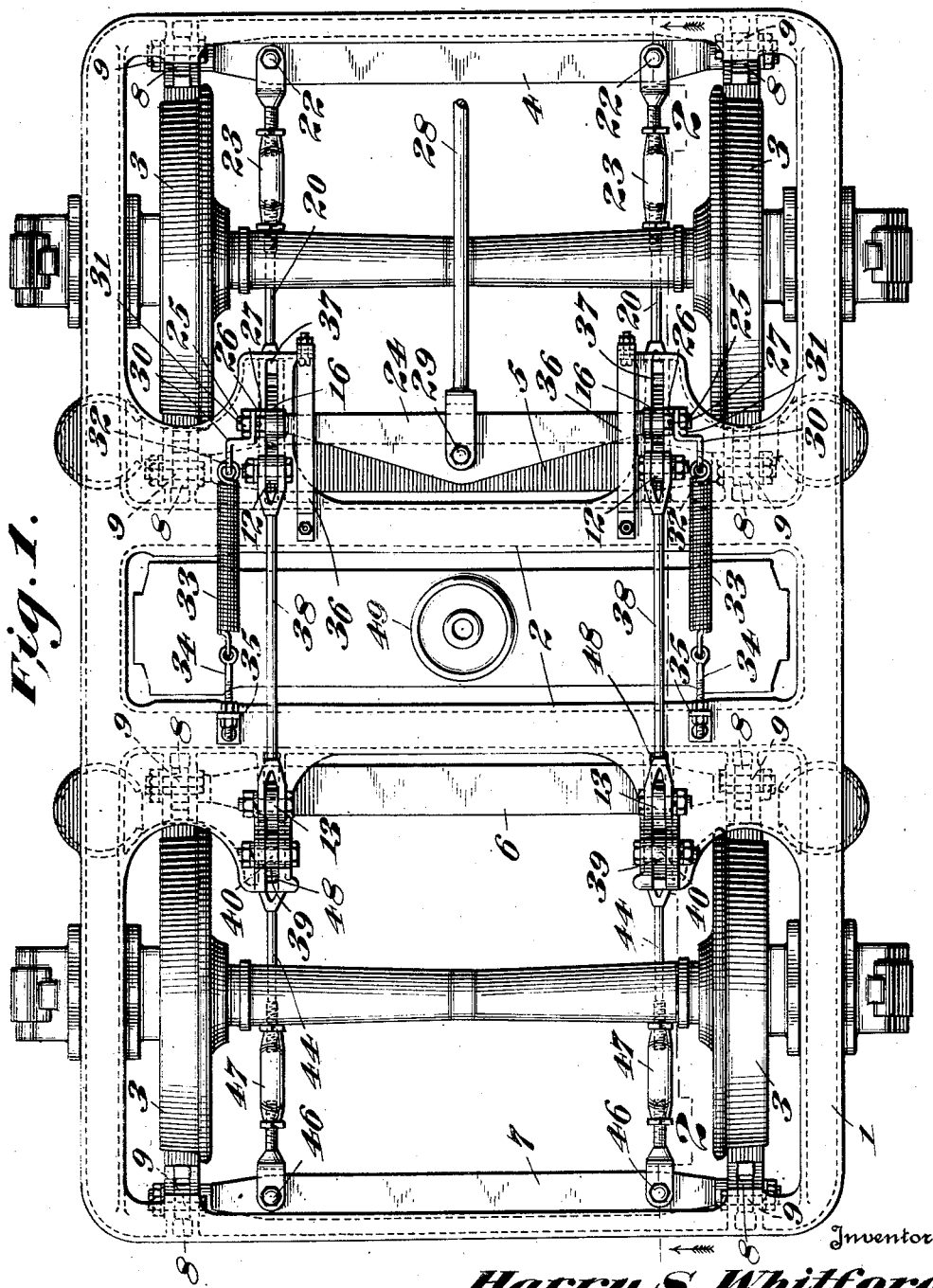
Figure 1 is a top plan view of a four-wheel car truck incorporating my improved clasp brake rigging, illustrating the application of my invention.

Referring now to the various characters of reference on the drawings, the numeral 1 indicates the truck frame, 2 the truck transoms and 3 the wheels. It will be noted that the brake mechanism on each side of the truck is constructed in a similar manner and a description of this mechanism at one side of the truck will apply to both. Brake beams 4, 5, 6 and 7 carrying brake heads and shoes at their ends are located at both sides of each pair of wheels. The brake beams are each supported at their ends by means of hangers 8, in which they are journaled, said hangers having their upper ends pivoted to the side frame as at 9.

The brake beams 5 and 6 which are supported inwardly of each wheel and are perforated as at 10 near each end between the wheels for receiving the cylindrical lower ends 11 of vertically disposed live truck levers 12 and 13 which are threaded as at 14 to receive nuts 15 for securing the ends of the live truck levers 12 and 13 to the brake beams 5 and 6.

A vertically disposed live operating truck lever 16 is connected centrally to the live truck lever 12 by means of links 17 which have their ends pivoted to each of said levers 12 and 16 as at 18 and 19. The lower end of each of the live operating truck levers 16 have a connecting bar 20 pivoted thereto as at 21, while the opposite end of said rod is pivoted as at 22 to the brake beam 4, and is provided with a turnbuckle 23 to allow for adjustment. The upper ends of the live operating truck levers which are disposed at each side of the truck are connected together by means of an equalizer bar 24, which has its ends formed cylindrical as at 25, and threaded to receive nuts 26, which are held in locked position by means of pins 27. A pull rod 28 having an operating connection with the brake cylinder (not shown) is pivoted as at 29 to the central portion of the equalizer bar 24. In order to assist in releasing the brake shoes from the wheel treads after the fluid pressure in the brake cylinder has been exhausted as is the usual practice in releasing brakes of this type, a bracket 30 is secured to each of the threaded ends 25 of the equalizer bar 24 by means of nuts 31. The opposite end of each of the brackets 30 is perforated as at 32 to receive the hooked end of a helical spring 33 which has its opposite end attached to an eye bolt 34 which is secured to the truck frame as at 35. In order to longitudinally guide the equalizer bar 24, keepers 36 are attached to the top of one of the transoms 2 of the truck frame and to prevent lateral movement of the same the live truck and operating levers 12 and 16 have their upper end portions extending through a slot 37 formed in the truck frame.

The upper ends of the live truck levers 12 and 13 are connected together by means of a connecting rod 38 to allow a uniform swinging movement.

A vertically disposed dead fulcrum lever 39 is pivoted at its upper end as at 40 to the truck frame and is connected centrally to the live truck lever 13 by means of links 41 which have their ends pivoted to each of said levers 13 and 39 as at 42 and 43. The lower end of the dead fulcrum lever 39 has a connecting bar 44, pivoted thereto as at 45, while the opposite end of said bar is pivoted as at 46 to the brake beam 7 and provided with a turnbuckle 47 to allow for adjustment. In order to guide and prevent lateral movement of each of the live truck levers 13 and dead fulcrum levers 39 the upper end portions of each two extend through a slot in the truck frame as at 48.

The operation of my braking mechanism is as follows: Assuming that the brake shoes are in the set position as indicated in the drawings and it is desired to release the brakes, fluid pressure in the brake cylinder is exhausted in the usual manner, the helical springs 33 will then pull the equalizer bar 24 inwardly towards the center plate indicated at 49 in Figure 1, thereby through the truck levers and connections swinging the brake heads carrying the shoes at the ends of the truck outwardly and the brake heads and shoes at the opposite inner surface of the wheel treads inwardly.

When it is desired to set the brakes, fluid pressure is admitted to the brake cylinder thereby pulling the equalizer bar 24 towards the right hand end of the truck, thereby swinging the brake heads and shoes on each side of each pair of wheels through the truck levers and connections inwardly into frictional engagement with the treads of the wheels. In this manner the power from the brake cylinder is directly applied to the live operating levers 16 and through the connections therefrom all of the brake beams are simultaneously swung inwardly or outwardly a uniform distance in setting or releasing the brakes, and as the brake heads are journaled on the cylindrical ends of the brake beams they are allowed to rotate slightly to compensate for wear so as to adjust themselves to properly engage the treads of the wheels.

Although I have shown and described my invention in considerable detail, I do not wish to be limited to the exact and specific details shown and described, but may use such substitutions, modifications or equivalents thereof, as are embraced within the scope of my invention, or as pointed out in the claims.

Having thus described my invention what I claim as new and desire to secure by Letters Patent is:

1. A clasp brake rigging for car trucks, a truck frame, a plurality of pairs of wheels for supporting said truck frame, a brake beam disposed inwardly and outwardly of each pair of wheels, a pair of live truck levers having their lower ends extending through each of the brake beams at the inner side of each pair of wheels and attached directly thereto, a live operating lever at each side of the truck, links connecting the central portion of each of the live truck levers attached to one of the inner brake beams with an operating lever, keepers secured to the truck transom, and an equalizer bar slidably supported in the keepers connecting the top ends of said operating levers and pivoted directly thereto adapted to support said operating levers.

2. In a brake rigging for a four-wheel railway car truck, a brake beam at the inner and outer side of each pair of wheels, vertically disposed live truck levers having their lower ends extending through and secured directly to the opposite end portions of the brake beams at the inner side of each pair of wheels, a vertically disposed operating lever at each side of the truck adjacent to each pair of live truck levers, links connecting the central portions of the live truck and operating levers together, keepers secured to the truck transom, an equalizer bar supported by the keepers pivoted directly to the operating levers adapted to support said operating levers, and bars and rods for connecting the brake beams and truck levers together.

3. In a brake rigging for railway trucks having a plurality of pairs of wheels, a brake beam at the inner and outer side of each pair of wheels, a pair of spaced vertically disposed live truck levers having their lower ends extending through each brake beam at the inner side of each pair of wheels and secured directly thereto, an operating lever pivoted centrally to each of the live truck levers secured to one of the brake beams disposed at the inner side of a pair of wheels, keepers secured to the truck transom, and an equalizer bar slidably mounted in the keepers having its ends pivoted in the upper ends of the operating levers for supporting said operating levers.

4. In a brake rigging for a railway truck having two pairs of wheels, a brake beam at the inner and outer side of each pair of wheels, hanger links for supporting the ends of the brake beams, vertically disposed truck levers having their lower ends secured directly to the opposite end portions of the brake beams at the inner side of each pair of wheels, a vertically disposed operating lever at each side of the truck attached centrally to a pair of live truck levers attached to one of the inner brake beams, keepers secured to the truck transom and an equalizer bar slidably mounted in the keepers having its ends pivoted directly to the top ends of the operating levers adapted to support said operating levers.

HARRY S. WHITFORD.